July 25, 1944.　　　　N. H. RICKER　　　　2,354,548
SEISMIC PROSPECTING
Filed Aug. 29, 1941　　　　2 Sheets-Sheet 1

Norman H. Ricker INVENTOR.
BY P. J. Whelan
ATTORNEY

July 25, 1944.  N. H. RICKER  2,354,548
SEISMIC PROSPECTING
Filed Aug. 29, 1941  2 Sheets—Sheet 2
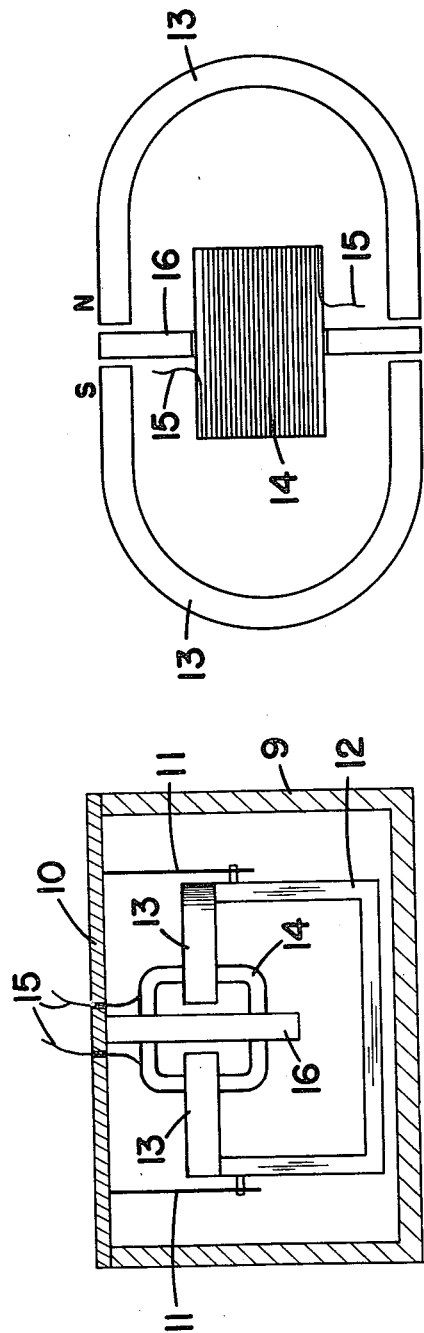
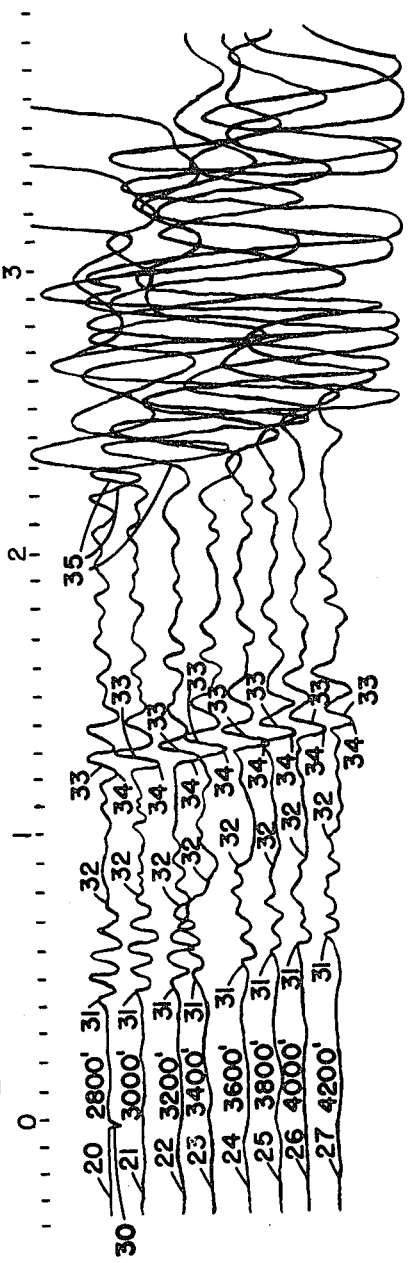
Norman H. Ricker INVENTOR.
BY
P. J. Whelan
ATTORNEY Patented July 25, 1944

2,354,548

UNITED STATES PATENT OFFICE 2,354,548

SEISMIC PROSPECTING

Norman H. Ricker, Tulsa, Okla., assignor to Standard Oil Development Company, a corporation of Delaware Application August 29, 1941, Serial No. 408,774

10 Claims. (Cl. 177—352)

The present invention is directed to seismic prospecting, by which is meant the determination of the nature of subsurface structure by the effect of this structure on the passage of seismic waves from a point of creation to a distant point of reception.

Seismic prospecting has developed along two general lines, namely, refraction prospecting and reflection prospecting. In the former, a shot point was located in the area to be investigated, and a pickup was arranged at a sufficient distance from the shot point to receive a compressional wave which started from the shot point, descended to a lower level, traveled through the lower level and ascended again to the surface. That is a refracted wave. This type of wave, being of a compressional nature, travels faster than any of the other waves generated by the shot, and, with the pickup spacing employed, was, therefore, the first to arrive at the pickup. Accordingly, the significant information was the first kick generated by the pickup, and the variations in the time of arrival of this first kick over the area with a given pickup spacing gave information concerning the contour of the substratum through which this compressional wave was refracted.

The reflection type of prospecting differs quite radically from the refraction type in that the significant waves are compressional waves which descend to a certain substratum and are reflected from this substratum back to the receiving point as compressional waves. Since the objective is to receive reflections, the approved procedure is to arrange the pickups with respect to the point of generation so as to receive waves which strike the reflecting layer as nearly vertically as possible. This type of prospecting involves the use of a plurality of pickups, since the significant information to be obtained is the times of arrival of reflected waves from a given reflecting layer at different pickups spaced differently from the point of generation. In general, it may be stated that in this type of prospecting it has been the practice to place the closest pickup a distance from the shot point less than the depth of the layer from which the reflections were expected.

In reflection prospecting, difficulty has been encountered in obtaining records capable of being easily interpreted and correlated. This is due to a large extent to the fact that, with the pickup spacing employed, direct shear waves and possibly surface waves from the point of generation often arrive at the pickups at about the same time as the desired reflections, resulting in considerable "hash" on the record which obscures the significant reflections. This difficulty has led to the development of complicated filtering systems having the purpose of filtering out from the records disturbances, other than the desired reflections, arriving at the pickups. The need for these filters has increased the cost of the method and has provided an additional source of trouble in the operation. Furthermore, these filters do not completely eliminate the "hash."

Another disadvantage of the reflection method utilizing reflected waves of the compressional type is that in many areas, due to the nature of the subterranean formations, these reflected waves in their travel upwardly from a reflecting layer are so distorted that they are not recorded as distinct, easily identifiable deflections on the record, but rather become an inseparable part of the "hash" on the record. In such areas no expedient has been developed which will overcome the effect of the subsurface formations on these reflections and make possible the production of records which can be interpreted and correlated. This latter difficulty is often encountered in areas where there are near surface deposits of gravel and/or unconsolidated sand.

In the foregoing, reference has been made to direct compressional waves, reflected compressional waves, and direct shear waves. It may be pointed out here that when a seismic disturbance is created, as by setting off a charge of dynamite, there are at least three different types of waves which may be received at a point located a distance from the point of disturbance which is less than the depth of the reflecting layer. These are the three types already referred to, namely, a direct compressional wave which travels close to the surface, a reflected compressional wave, and a direct shear wave. In a compressional wave, the energy in passing through the earth sets up movement of the earth particles in a direction parallel to the direction of travel of the wave, while in a shear wave the energy in passing through the earth sets up motion of the particles in a direction transverse to the direction of the travel of the wave.

The present invention is based on the fact that when a compressional wave strikes a reflecting layer at an oblique angle, there are two types of waves reflected—the one being a compressional wave which makes an angle with the reflecting layer the same as the angle made by the incident wave, and the other a shear wave which makes a greater grazing angle with the reflecting layer than the incident wave. It has now been found that this shear wave which is generated by the reflection of a compressional wave from a reflecting layer at a sufficient distance laterally from the point of disturbance contains sufficient energy to be readily recorded at the surface.

In the following discussion reference will be made to the angle of incidence which a compressional wave makes with a reflecting layer. It is to be understood that this angle is the angle between the line of travel of the compressional wave and a line normal to the reflecting layer at the point of incidence. The angle between the line of travel of the compressional wave and the reflecting layer itself at the point of incidence is called the grazing angle.

A shear wave containing measurable energy may be generated by reflection of a compressional wave, when the angle of incidence of the compressional wave is not less than a certain critical value which may be expressed in general terms as that angle whose sin equals $$\frac{V_1}{V_2}$$

where $V_1$ is the velocity of the compressional wave in the region above the reflecting layer, and $V_2$ is the velocity of the compressional wave in the reflecting layer. If the angle of incidence of the compressional wave with the reflecting layer is less than this critical value, the energy in the shear wave is greatly decreased. There is not a great deal of latitude in this direction because the decrease in energy of the shear wave with a decrease in the angle of incidence is very rapid and the energy quickly reaches a value too small to be measured. If the angle of incidence of the compressional wave with the reflecting layer increases over the critical value, there is also a decrease in the energy of the generated shear wave, but this decrease is more gradual, whereby there is considerably more latitude in the direction of increasing the angle of incidence. Should an area be found in which the above relationship of shear wave energy to angle of incidence does not hold, this relationship may be readily determined by a few simple experiments.

In general, it may be stated for practical purposes that the angle of incidence of the compressional wave with the reflecting layer may be adjusted close to the desired value by spacing the pickups from the shot point a distance greater than the depth of the reflecting layer, and preferably from two to four times this depth. Thus, a very pronounced shear wave generated by the reflection of a compressional wave has been found to be obtainable from a reflecting layer about 1000 feet deep by placing the closest pickup to the shot point at a distance of about 3000 feet from the shot point and spacing the other pickups about a distance of 200 feet apart. It will be understood, of course, that this spacing changes from area to area and with the depth of the reflecting layer, and with the velocities of compressional waves involved, as dictated by the nature of the substrata. In general, an angle of incidence of 60° or greater has been found suitable.

Since the present invention is based on the observation on the recording of shear waves generated by the reflection of compressional waves, it is necessary to use pickups which have a moving system responsive to horizontal motion as distinguished from the conventional pickup in which the moving system responds to vertical motions.

The velocity of shear waves through earth is much slower than the velocity of compressional waves. Such being the case, the travel time of shear waves is much greater than that of pure compressional waves. Accordingly, the speed at which the record strip is moved in the practice of the present invention is considerably slower than the speed at which it was moved in seismic operations in accordance with previously known methods which were based on the observation of compressional waves, because if the speed of the record strip formerly employed were used in the method of the present invention, the significant reflection would be spread out on the record strip and its detection would be difficult. Therefore, the record strip speed in operations, according to the present invention, is ordinarily from one-third to one-tenth of the speed usually employed in reflection work based on compressional waves. A suitable range of record strip speeds is from two to seven inches per second.

It has been found that in the areas thus far investigated this shear wave generated from the reflection of a compressional wave appears on the record in fairly isolated position. This is because its arrival time is different from that of both the compressional and original shear waves, by reason of the fact that for one portion of its travel time it is a compressional wave and for another portion it is a shear wave. For this reason, it is termed a composite wave. With the pickup spacing employed in the practice of the present invention, there are at least four types of waves which arrive at the pickup as a result of a disturbance at the point of creation. In the order of their time of arrival they are (1) a direct compressional wave which travels in the near surface layers, (2) a reflected compressional wave which is received at the pickup as a compressional wave, (3) the composite wave which is observed in the practice of the present invention, and (4) a direct shear wave. Where the high velocity layer is sufficiently close to the surface, or the ratio between the distance between the shot point and the first pickup and the depth of the high velocity layer is sufficiently large, there may also be received a refracted compressional wave which will arrive either first or second, depending on the factors mentioned above. Thus, the composite wave arrives at the pickup in the interval between the arrival of compressional waves and the arrival of the direct shear waves, which are waves of the shear type from the point of disturbance or origin, which, in the ordinary case, will be a substantial interval.

The nature of the present invention may be more readily understood from the following description of the accompanying drawings in which Fig. 1 is a diagrammatic illustration of a layout for the practice of the present invention illustrating the types of waves which are released;

Fig. 2 is a front elevation, partly in section, of a pickup suitable for use in the practice of the present invention;

Fig. 3 is a skeleton view of the magnetic circuit in the pickup shown in Fig. 2; and Fig. 4 is a typical record obtained in the practice of the present invention.

Figure 1:
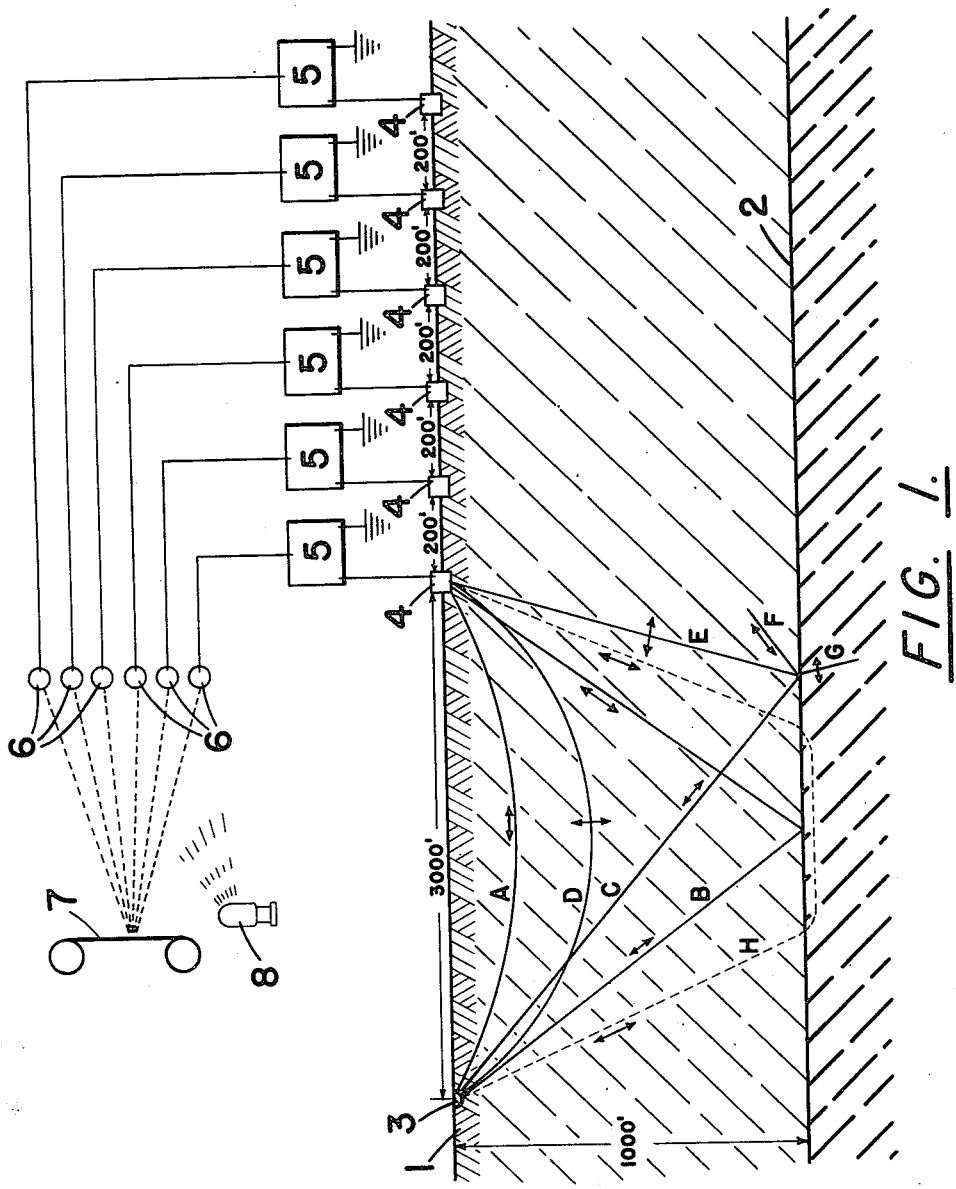

Referring to Fig. 1, numeral 1 designates the surface of the earth and numeral 2 designates a reflecting layer at a depth of 1000 feet. Numeral 3 designates a shot point. A plurality of pickups, each designated by numeral 4, are arranged in alignment with the shot point, the first of these pickups being 3000 feet from the shot point and the remainder being 200 feet from each other. The output of each pickup is fed to an amplifier 5 which, in turn, delivers to a corresponding galvanometer 6. These galvanometers are arranged in a battery and are of the reflecting type. Numeral 7 designates a record strip which is arranged for travel transversely of the battery of the galvanometers. The mirrors of the galvanometers reflect light from a source 8 onto a record strip 7 which is made of sensitized paper, with the result that the movement of the current responsive element of each galvanometer is recorded on the sensitized strip as a wavy line.

When an explosion is set off at the shot point, a number of waves travel from the shot point through the earth to each pickup. The paths of some of these waves are designated in Fig. 1, in the order of the time of arrival of these waves at the pickup, as A, B, C and D. The line designated A represents the path of a direct compressional wave which travels in the surface or near surface layers. The line designated B represents the path of a wave which is a compressional wave reflected as a compressional wave and so received at the pickup. The line designated C represents the path of a compressional wave which strikes the reflecting layer 2 with an angle of incidence of the order of 60°, and then is broken up into components, one of which (designated by E) is a shear wave. Another component, F, is a compressional wave having an angle of reflection the same as the angle of incidence of wave C. G designates a refracted component of the compressional wave C.

The wave, the path of which is indicated by D, is a pure shear wave generated at the shot point. It travels generally at a greater depth than the direct compressional wave and is known to follow a curved path. With respect to each of these waves, the direction of vibration of the ground particles in the path of the wave is indicated by a double pointed arrow intersecting or parallel to the line indicating each wave.

As has been previously indicated, where the ratio between the distance between the first pickup and the shot point and the depth of the high velocity layer is sufficiently great, there may also be a refracted compressional wave received at the pickup. Assuming the layer below line 2 to be a high velocity layer, this refracted compressional wave will follow a path indicated by H. When this is received at the pickup, it will arrive just before or just after the direct compressional wave A, depending upon the distances and depths involved.

Referring to Fig. 2, numeral 9 designates a case having a cover 10 from which depend a pair of leaf springs 11 from which is suspended a framework 12 in the form of a U, carrying at each free end a horizontally arranged horseshoe magnet 13. These magnets have their poles in juxtaposition with the north pole of one magnet facing the south pole of the other. Suspended in the fields of these magnets is a coil 14 with electrical leads 15 which deliver the output of the coil to an amplifier. The coil is carried on a flat armature 16 which extends laterally between the poles of the magnets. The lines of force from each magnet run from the north pole through the armature, thereby cutting the coil to the south pole.

When the moving system which is composed of the bracket 12 and the magnets 13 moves to the left, a current is sent through the coil in one direction, and when it moves to the right a current is sent through the coil in the opposite direction. The vibration of the moving system thereby sets up an oscillating current in the coil which current is delivered to the amplifier. It may be noted at this point that the moving system in these pickups is usually immersed in oil which serves to damp the vibrations. In use, these pickups are arranged in alignment with the shot point. The moving system of each pickup is arranged to oscillate in the line passing through the shot point and the several pickups. In addition, these pickups must be so placed and connected to their respective galvanometers that for a movement of the several moving systems in a given direction the corresponding galvanometers will all be deflected in the same direction.

The record shown in Fig. 4 was produced by a system such as that shown in Fig. 1. Eight pickups were employed. The distance between the shot point and the closest pickup was 2800 feet, and the pickups were 200 feet apart. The reflecting layer in this area was at a depth of about 1600 feet. The top trace, indicated by numeral 20, was the trace recorded from the pickup closest to the shot point and the successively lower traces 21, 22, 23, 24, 25, 26 and 27 were derived from the pickups successfully further removed from the shot point. It will be noted that the trace 20 has a sharp break 30 which resulted from the radio signal indicating the time at which the shot was fired. The small spaced vertical lines above the traces are time lines, the space between successive lines indicating $\frac{1}{10}$ of a second.

The first kick on each trace is indicated by numeral 31, and this represents the time of arrival of the direct compressional wave. With vertical pickups, the first kick would be much more pronounced. In the space between point 31 and point 32 on each trace any reflected compressional wave arriving at the pickups is recorded. Likewise, any refracted compressional wave which may have arrived would be recorded in this space. It will be noted that the reflected compressional wave is not easily identifiable and this is to be expected from the fact that horizontal pickups were employed which would respond only to a small component of a reflected compressional wave.

On each trace the composite wave is designated by numeral 33. For calculations based on arrival time of these waves at the respective pickups, the bottom of the trace, indicated by numeral 34, is selected as the arrival time. It will be noted in this case that the composite wave appears on the record as a very pronounced and easily identifiable deflection which carries over from pickup to pickup without any breaks.

The "hash," beginning at a point indicated by numeral 35, is caused by the arrival at the pickups of the pure or original shear waves. In conventional reflection prospecting, the reflected compressional waves are frequently intermingled with similarly appearing "hash." As will be readily apparent from the record, it would be very difficult to pick out a reflection from this "hash," and this has been the experience in reflection prospecting.

In the foregoing discussion, much has been made of the fact that, because of the isolated position which the composite wave occupies on the record when the operating conditions are observed, filtering can be dispensed with. In certain areas, however, filtering may nevertheless be desirable. When filtering is employed, the filter used should be one which passes low frequencies of a range which is in general lower than that involved in ordinary reflection shooting. Whereas the filter in the receiving circuit of the conventional reflecting apparatus is selected to pass frequencies from about 35 to about 140 cycles, the filter used in the receiving circuit in the practice of the present invention should preferably be selected to pass frequencies from two to about twenty cycles per second. This difference in filtering requirements will be apparent from the fact that the frequencies which predominate in shear waves are generally of a lower order than those which predominate in compressional waves. It is this difference in frequency characteristics which led initially to the adoption of filtering in reflection prospecting, in the hope that reflected compressional waves could be wholly separated from direct shear waves. There is some overlapping of the frequency components of the two types of waves, however, which prevent a full realization of this hope.

While the description has thus far dealt with composite waves, that is, shear waves which are formed by reflection of a compression wave from a reflecting layer, there is found in the records produced by the practice of the method of the present invention also shear waves which started as such at the point of disturbance and were reflected from the reflecting layer. These shear reflections are of lower velocity than the composite waves and are usually found on the record at a point after the "hash." This is particularly the case when the lower record-strip feed-rates of the range specified are employed, and when very low pass filters, such as those which freely pass up to about 8 cycles per second and then begin to attenuate, are employed.

It may also be observed that the wave fronts which are caused by the arrival of refracted shear waves, are frequently easily capable of alignment and constitute a useful source of information for interpretation. Thus, there are three types of shear waves that are found and made available for interpretation purposes by the method of the present invention, namely, the composite waves, the refracted shear waves, and the reflected shear waves.

The nature and objects of the present invention having been thus described and illustrated, what is claimed as new and useful and what is desired to be secured by Letters Patent is:

1. A method for the investigation of earth substrata which comprises establishing a disturbance point in the area to be investigated, establishing a reception point for seismic waves at each of a plurality of spaced points aligned with the disturbance point and with each other and removed from the disturbance point a distance greater than the depth of the reflecting layer in said area but sufficiently close to the disturbance point to receive a substantial quantity of energy from said disturbance, arranging at each reception point a detector responsive primarily to shear waves and a recorder for the responses of said detector, creating a seismic disturbance at the disturbance point, and recording the waves received by the detector at each reception point.

2. A method according to claim 1 in which the reception point is spaced from the disturbance point a distance from 2 to 4 times the depth of the reflecting layer.

3. A method for the investigation of earth substrata which comprises establishing a disturbance point in the area to be investigated, establishing a reception point for seismic waves at each of a plurality of spaced points aligned with the disturbance point and with each other and removed from the disturbance point a distance such that a compressional wave generated at the disturbance point and reflected as a shear wave from a subsurface layer to each reception point will have an angle of incidence with said reflecting layer not less than that angle, the sine of which equals $$\frac{V_1}{V_2}$$

where $V_1$ is the velocity of the compressional waves in the region above the reflecting layer and $V_2$ is the velocity of the compressional waves in the reflecting layer, arranging at each reception point a detector primarily responsive to shear waves and a recorder for the responses of said detector, creating a seismic disturbance at the disturbance point and recording the waves received by the detector at each reception point.

4. A method according to claim 3 in which the relation between the disturbance point and the reception points is such that a compressional wave leaving the disturbance point and being reflected to the reception points from a reflecting layer has an angle of incidence with said reflecting layer of at least about 60°.

5. A method for the investigation of earth substrata which comprises establishing a disturbance point in the area to be investigated, establishing a reception point for seismic waves at each of a plurality of spaced points aligned with the disturbance point and with each other and removed from the disturbance point a distance greater than the depth of a reflecting layer in said area and sufficiently close to the disturbance point to receive a substantial quantity of energy from said disturbance, placing at each reception point a detector capable of translating seismic waves into electrical impulses, having a horizontally movable moving system disposed with its direction of movement in line with the disturbance point, providing a recorder for the electrical oscillations generated by said detectors, and creating a seismic disturbance at the disturbance point, whereby a shear wave generated by the reflection of a compressional wave from said reflecting layer is received by said detectors and recorded by said recorder.

6. A method according to claim 5 in which the recorder is one in which the oscillations are recorded on a moving strip of paper and the strip of paper is moved at a rate of from 2 to 7 inches per second.

7. A method for the investigation of the earth's substrata which comprises establishing a disturbance point in the area to be investigated, establishing a reception point for seismic waves at each of a plurality of spaced points aligned with the disturbance point and with each other and removed from the disturbance point a distance such that a compressional wave generated at the disturbance point and reflected by a subsurface reflecting layer to each reception point will have an angle of incidence with said reflecting layer not less than that angle the sine of which is equal to $$\frac{V_1}{V_2}$$

where $V_1$ is the velocity of the compressional waves in the region above the reflecting layer and $V_2$ is the velocity of the compressional waves in the reflecting layer, placing at each reception point a detector capable of translating seismic waves into electrical impulses, having a horizontally movable moving system disposed with its direction of movement in line with the disturbance point, providing a recorder for the electrical oscillations generated by said detectors including a movable strip upon which said oscillations are recorded, creating a seismic disturbance at the disturbance point and recording the oscillations generated by each detector while moving said strip at a speed of from 2 to 7 inches per second.

8. A method according to claim 7 in which the angle of incidence of the compressional waves is not less than 60°.

9. A method for the investigation of earth substrata which comprises establishing a disturbance point in the area to be investigated, creating a seismic disturbance at the disturbance point, establishing a reception point for seismic waves at each of a plurality of spaced points removed from the disturbance point but sufficiently close to this point to receive energy from said disturbance, and receiving at each reception point and recording as a function of time, shear waves generated by the reflection of a compressional wave from reflecting layers in said earth substrata.

10. A method for the investigation of earth substrata which comprises establishing a disturbance point in the area to be investigated, creating a seismic disturbance at the disturbance point, establishing a reception point for seismic waves at each of a plurality of spaced points removed from the disturbance point but sufficiently close to the disturbance point to receive energy from said disturbance, and receiving at each reception point and recording as a function of time as separate indicia on a record both shear waves generated by the reflection of a compressional wave from reflecting layers in said earth substrata and compressional waves reflected from said reflecting layers.

NORMAN H. RICKER.